(12) United States Patent
Otsuka et al.

(10) Patent No.: US 9,048,731 B2
(45) Date of Patent: Jun. 2, 2015

(54) RECTIFYING APPARATUS

(71) Applicant: Kabushiki Kaisha Toshiba, Minato-Ku, Tokyo (JP)

(72) Inventors: Masafumi Otsuka, Yokohama (JP); Hirotoshi Aizawa, Kawasaki (JP); Toru Takayama, Yokohama (JP)

(73) Assignee: Kabushiki Kaisha Toshiba, Minato-Ku, Tokyo (JP)

( * ) Notice: Subject to any disclaimer, the term of this patent is extended or adjusted under 35 U.S.C. 154(b) by 0 days.

(21) Appl. No.: 14/167,574

(22) Filed: Jan. 29, 2014

(65) Prior Publication Data

US 2015/0003128 A1 Jan. 1, 2015

(30) Foreign Application Priority Data

Jun. 26, 2013 (JP) ................. 2013-134096

(51) Int. Cl.
*H02M 7/04* (2006.01)
*H02M 5/42* (2006.01)
*H02M 7/217* (2006.01)

(52) U.S. Cl.
CPC ..................... *H02M 7/217* (2013.01)

(58) Field of Classification Search
USPC ........ 363/44, 50, 52–53, 81, 84, 89, 125, 127
See application file for complete search history.

(56) References Cited

U.S. PATENT DOCUMENTS

| | | | | |
|---|---|---|---|---|
| 5,345,376 A * | 9/1994 | Nourbakhsh | .................. | 363/62 |
| 5,615,097 A * | 3/1997 | Cross | .............................. | 363/84 |
| 5,923,549 A * | 7/1999 | Kobayashi et al. | ............. | 363/65 |
| 5,940,287 A * | 8/1999 | Brkovic | ........................ | 363/127 |
| 5,949,223 A * | 9/1999 | Mine | .............................. | 323/224 |
| 6,304,474 B1 | 10/2001 | Shinkawa | | |
| 6,324,084 B1 | 11/2001 | Fujisawa | | |
| 6,366,485 B1 | 4/2002 | Fujisawa | | |
| 8,013,585 B2 * | 9/2011 | Yamada | ........................ | 323/285 |
| 8,040,696 B2 * | 10/2011 | Wu et al. | .................... | 363/21.02 |
| 8,085,557 B2 * | 12/2011 | Ito et al. | ....................... | 363/17 |
| 8,786,247 B2 * | 7/2014 | Ishino et al. | .................. | 320/101 |
| 2002/0054499 A1 * | 5/2002 | Tanaka et al. | ................. | 363/132 |
| 2007/0008757 A1 * | 1/2007 | Usui et al. | ..................... | 363/125 |
| 2007/0035972 A1 * | 2/2007 | Hikosaka | ........................ | 363/24 |
| 2008/0158926 A1 * | 7/2008 | Umeda et al. | ................. | 363/127 |
| 2009/0086519 A1 * | 4/2009 | Sadakata et al. | ............. | 363/131 |
| 2009/0285003 A1 * | 11/2009 | Ishii | ............................. | 363/127 |
| 2010/0109571 A1 * | 5/2010 | Nishino et al. | ................ | 315/307 |
| 2012/0069605 A1 * | 3/2012 | Choi | .......................... | 363/21.02 |

(Continued)

FOREIGN PATENT DOCUMENTS

| | | |
|---|---|---|
| JP | 2001-186771 A | 7/2001 |
| JP | 2003-309978 A | 10/2003 |
| WO | 00-17993 A1 | 3/2000 |

*Primary Examiner* — Timothy J Dole
*Assistant Examiner* — Yusef Ahmed
(74) *Attorney, Agent, or Firm* — White & Case LLP

(57) ABSTRACT

A rectifying apparatus (power receiving apparatus) 100 is configured to receive electric power output from the power transmitting apparatus 101. The rectifying apparatus 100 is mobile equipment, such as a battery, a smartphone incorporating a battery and a tablet PC, or equipment for a battery charger connected to the equipment. The rectifying apparatus (power receiving apparatus) 100 may be any other equipment that receives electric power output from the associated power transmitting apparatus 101, including a rechargeable electric car, a household appliance and a product for underwater application.

20 Claims, 7 Drawing Sheets

(56) References Cited

U.S. PATENT DOCUMENTS

2012/0092909 A1* 4/2012 Usami ............................ 363/80
2012/0092911 A1* 4/2012 Usami ............................ 363/89
2012/0106218 A1* 5/2012 Awane et al. ................. 363/127
2013/0176758 A1* 7/2013 Tseng et al. ................... 363/89
2013/0308347 A1* 11/2013 Sato et al. ................. 363/21.03
2013/0308358 A1* 11/2013 Usami ............................ 363/84

* cited by examiner

RECTIFYING APPARATUS

CROSS-REFERENCE TO RELATED APPLICATION

This application is based upon and claims the benefit of priority from the prior Japanese Patent Application No. 2013-134096, filed on Jun. 26, 2013, the entire contents of which are incorporated herein by reference.

BACKGROUND

1. Field

Embodiments described herein relate generally to a rectifying apparatus.

2. Background Art

A conventional synchronous rectifying apparatus has a problem that, if the on-resistance is decreased in order to reduce loss, the rectifying apparatus can hardly achieve rectification, and a backflow occurs. As a measure against the backflow, a pMOS transistor on the high side can be forced to serve as a diode. In the case of the conventional rectifying apparatus, however, a current flows because of a parasitic element of the pMOS transistor, and the efficiency of the rectifying apparatus decreases.

DETAILED DESCRIPTION

Figure 1:
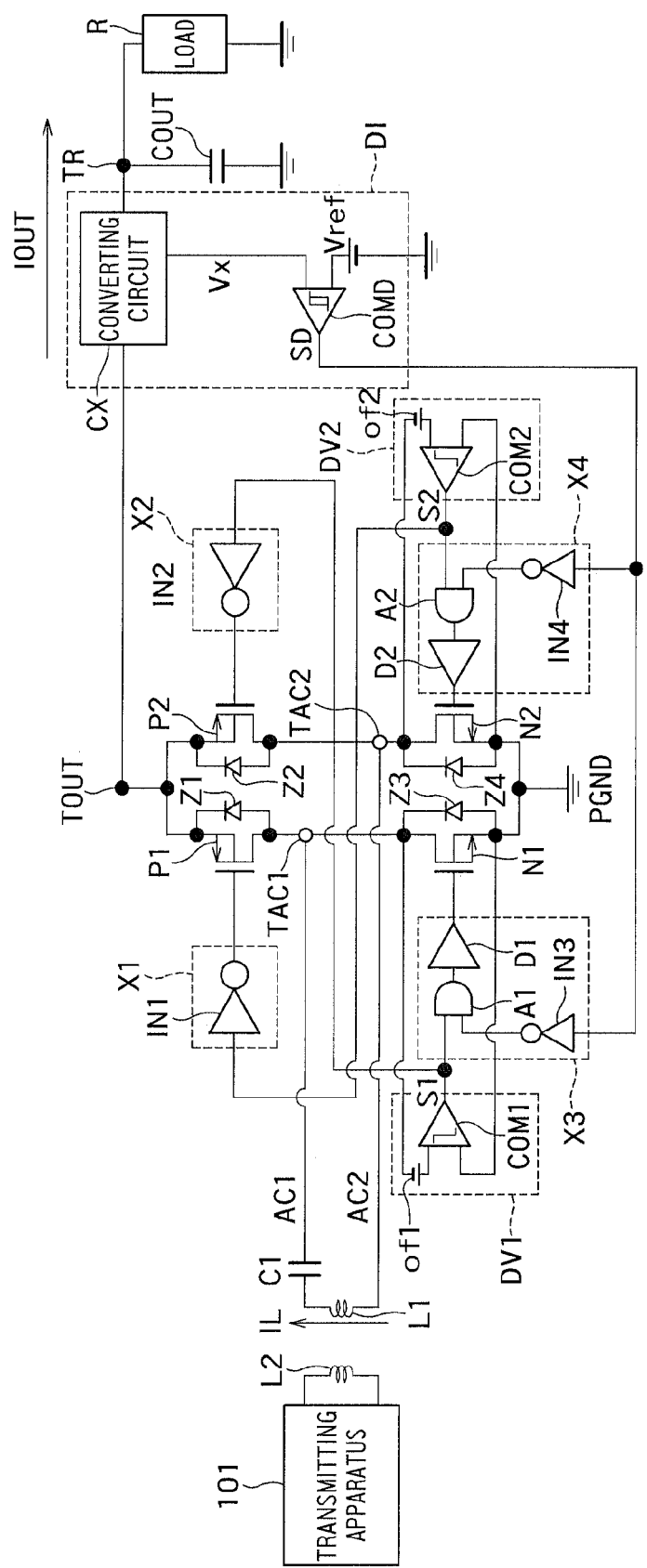
FIG. 1 is a circuit diagram showing an example of a configuration of a rectifying apparatus 100 according to a first embodiment.

A rectifying apparatus, according to an embodiment, receives electric power transmitted from the power transmitting apparatus by wireless power transmission, and rectifies the resulting current and outputs the rectified current. The rectifying apparatus includes a power receiving coil connected between a first power receiving terminal and a second power receiving terminal, and configured to be electromagnetically coupled with the power transmitting coil in the power transmitting apparatus. The rectifying apparatus includes a power receiving capacitor connected in series with the power receiving coil between the first power receiving terminal and the second power receiving terminal. The rectifying apparatus includes a first pMOS transistor connected to an output terminal at a source thereof and to the first power receiving terminal at a drain thereof. The rectifying apparatus includes a second pMOS transistor connected to the output terminal at a source and to the second power receiving terminal at a drain thereof. The rectifying apparatus includes a first nMOS transistor connected to the first power receiving terminal at a drain thereof and to a fixed potential at a source thereof. The rectifying apparatus includes a second nMOS transistor connected to the second power receiving terminal at a drain thereof and to the fixed potential at a source thereof. The rectifying apparatus includes a current detecting circuit that detects a load current flowing between a load terminal to which a load is connected and the output terminal and outputs a current detection signal responsive to a result of comparison between the load current and a preset threshold. The rectifying apparatus includes a first voltage detecting circuit that detects a voltage between the first power receiving terminal and the fixed potential or between the output terminal and the first power receiving terminal. The rectifying apparatus includes a second voltage detecting circuit that detects a voltage between the second power receiving terminal and the fixed potential in a case where the first voltage detecting circuit detects the voltage between the first power receiving terminal and the fixed potential, and detects a voltage between the output terminal and the second power receiving terminal in a case where the first voltage detecting circuit detects the voltage between the output terminal and the first power receiving terminal. The rectifying apparatus includes a first controlling circuit that controls the first pMOS transistor based on a result of detection by the second voltage detecting circuit. The rectifying apparatus includes a second controlling circuit that controls the second pMOS transistor based on a result of detection by the first voltage detecting circuit. The rectifying apparatus includes a third controlling circuit that controls the first nMOS transistor based on the current detection signal and the result of detection by the first voltage detecting circuit. The rectifying apparatus includes a fourth controlling circuit that controls the second nMOS transistor based on the current detection signal and the result of detection by the second voltage detecting circuit.

In the following, embodiments will be described with reference to the drawings.

First Embodiment

FIG. 1 is a circuit diagram showing an example of a configuration of a rectifying apparatus 100 according to a first embodiment.

In FIG. 1, a power transmitting apparatus 101 is configured to transmit electric power. The power transmitting apparatus 101 is a charger for mobile equipment, such as a smartphone and a tablet PC, for example.

A rectifying apparatus (power receiving apparatus) 100 is configured to receive electric power output from the power transmitting apparatus 101. The rectifying apparatus 100 is mobile equipment, such as a battery, a smartphone incorporating a battery and a tablet PC, or equipment for a battery charger connected to the equipment. The rectifying apparatus (power receiving apparatus) 100 may be any other equipment that receives electric power output from the associated power transmitting apparatus 101, including a rechargeable electric car, a household appliance and a product for underwater application.

Power transmission from the power transmitting apparatus 101 to the rectifying apparatus (power receiving apparatus) 100 is achieved by electromagnetically coupling a power transmitting coil (primary coil) "L2" in the power transmitting apparatus 101 and a power receiving coil (secondary coil) "L1" in the rectifying apparatus (power receiving apparatus) 100 to form a power transmission transformer. In this way, non-contact power transmission can be achieved.

As described above, the rectifying apparatus 100 receives electric power transmitted from the power transmitting apparatus 101 by wireless power transmission, rectifies the resulting current and outputs the rectified current.

As shown in FIG. 1, the rectifying apparatus 100 includes the power receiving coil "L1", a power receiving capacitor "C1", an output capacitor "COUT", a first pMOS transistor "P1", a second pMOS transistor "P2", a first nMOS transistor "N1", a second nMOS transistor "N2", a current detecting circuit "DI", a first voltage detecting circuit "DV1", a second voltage detecting circuit "DV2", a first controlling circuit "X1", a second controlling circuit "X2", a third controlling circuit "X3", and a fourth controlling circuit "X4", for example.

The power receiving coil "L1" is connected between a first power receiving terminal "TAC1" and a second power receiving terminal "TAC2" and is configured to be electromagnetically coupled with the power transmitting coil "L2" in the power transmitting apparatus 101.

For example, the rectifying apparatus 100 is configured to transmit a signal to control an output electric power from the power receiving coil "L1" to the power transmitting coil "L2" in the power transmitting apparatus 101. The power transmitting apparatus 101 is configured to obtain, by envelope detection, information based on a load current "IOUT" from the signal received at the power transmitting coil "L2".

The power receiving capacitor "C1" is connected in series with the power receiving coil "L1" between the first power receiving terminal "TAC1" and the second power receiving terminal "TAC2".

The output capacitor "COUT" is connected between a load terminal "TR" and a ground "PGND". The output capacitor "COUT" is configured to smooth the output voltage at the load terminal "TR". The ground "PGND" is an example of a fixed potential. Therefore, in this embodiment, the ground may be replaced by the fixed potential.

The first pMOS transistor "P1" is connected to an output terminal "TOUT" at a source thereof and to the first power receiving terminal "TAC1" at a drain thereof. The first pMOS transistor "P1" includes a parasitic diode "Z1".

The second pMOS transistor "P2" is connected to the output terminal "TOUT" at a source thereof and to the second power receiving terminal "TAC2" at a drain thereof. The second pMOS transistor "P2" includes a parasitic diode "Z2".

The first nMOS transistor "N1" is connected to the first power receiving terminal "TAC1" at a drain thereof and to the ground "PGND" at a source thereof. The first nMOS transistor "N1" includes a parasitic diode "Z3".

The second nMOS transistor "N2" is connected to the second power receiving terminal "TAC2" at a drain thereof and to the ground "PGND" at a source thereof. The second nMOS transistor "N2" includes a parasitic diode "Z4".

The current detecting circuit "DI" is configured to detect the load current "IOUT" flowing between the load terminal "TR" to which a load "R" is connected and the output terminal "TOUT" and output a current detection signal "SD" responsive to a result of comparison of the load current "IOUT" and a preset threshold.

The current detecting circuit "DI" outputs the current detection signal "SD" at a "High" level if the load current "IOUT" is lower than the threshold, for example.

On the other hand, the current detecting circuit "DI" outputs the current detection signal "SD" at a "Low" level if the load current "IOUT" is equal to or higher than the threshold.

As shown in FIG. 1, the current detecting circuit "DI" has a converting circuit "CX", a current detecting comparator "COMD" and a reference direct-current power supply "Vref", for example.

The converting circuit "CX" is configured to output a converted voltage "Vx" responsive to the load current "IOUT". More specifically, the converting circuit "CX" outputs a converted voltage "Vx" in proportion to the load current "IOUT".

The reference direct-current power supply "Vref" is connected to the ground "PGND" at a negative electrode thereof and to an input of the current detecting comparator "COMD" at a positive electrode thereof. The reference direct-current power supply "Vref" is configured to output a reference voltage.

The current detecting comparator "COMD" is configured to compare the converted voltage "Vx" with a preset reference voltage and output a signal responsive to a result of the comparison as the current detection signal "SD".

The current detecting comparator "COMD" outputs the current detection signal "SD" at the "High" level if the converted voltage "Vx" is lower than the reference voltage, for example.

On the other hand, the current detecting comparator "COMD" outputs the current detection signal "SD" at the "Low" level if the converted voltage "Vx" is equal to or higher than the reference voltage.

In the example shown in FIG. 1, the first voltage detecting circuit "DV1" is configured to detect the voltage between the first power receiving terminal "TAC1" and the ground "PGND". Alternatively, however, the first voltage detecting circuit "DV1" may be configured to detect the voltage between the output terminal "TOUT" and the first power receiving terminal "TAC1".

The first voltage detecting circuit "DV1" is configured to output a signal responsive to the detected voltage.

As shown in FIG. 1, the first voltage detecting circuit "DV1" has a first direct-current power supply "of1" and a first comparator "COM1", for example.

The first direct-current power supply "of1" is connected to the first power receiving terminal "TAC1" at a negative electrode thereof.

The first comparator "COM1" compares a first voltage at a positive electrode of the first direct-current power supply "of1" and a ground voltage. The first comparator "COM1" outputs a signal "S1" at a "High" level if the first voltage is lower than the ground voltage and outputs the signal "S1" at a "Low" level if the first voltage is equal to or higher than the ground voltage, for example.

The first controlling circuit "X1" is configured to output a first control signal to a gate of the first pMOS transistor "P1" based on a result of detection by the second voltage detecting circuit "DV2" to control the first pMOS transistor "P1".

As shown in FIG. 1, the first controlling circuit "X1" has a first inverter "IN1", for example.

The first inverter "IN1" is connected to an output of a second comparator "COM2" at an input thereof and to the gate of the first pMOS transistor "P1" at an output thereof.

The second controlling circuit "X2" is configured to output a second control signal to a gate of the second pMOS transistor "P2" based on a result of detection by the first voltage detecting circuit "DV1" to control the second pMOS transistor "P2".

As shown in FIG. 1, the second controlling circuit "X2" has a second inverter "IN2", for example.

The second inverter "IN2" is connected to an output of the first comparator "COM1" at an input thereof and to the gate of the second pMOS transistor "P2" at an output thereof.

In the example shown in FIG. 1, the second voltage detecting circuit "DV2" is configured to detect the voltage between the second power receiving terminal "TAC2" and the ground "PGND". Alternatively, however, in the case where the first voltage detecting circuit "DV1" detects the voltage between the output terminal "TOUT" and the first power receiving terminal "TAC1", the second voltage detecting circuit "DV2" may be configured to detect the voltage between the output terminal "TOUT" and the second power receiving terminal "TAC2".

That is, in the case where the first voltage detecting circuit "DV1" detects the voltage between the first power receiving terminal "TAC1" and the ground "PGND", the second voltage detecting circuit "DV2" detects the voltage between the second power receiving terminal "TAC2" and the ground "PGND". On the other hand, in the case where the first voltage detecting circuit "DV1" detects the voltage between the output terminal "TOUT" and the first power receiving terminal "TAC1", the second voltage detecting circuit "DV2" detects the voltage between the output terminal "TOUT" and the second power receiving terminal "TAC2".

The second voltage detecting circuit "DV2" is configured to output a signal responsive to the detected voltage.

As shown in FIG. 1, the second voltage detecting circuit "DV2" has a second direct-current power supply "of2" and a second comparator "COM2", for example.

The second direct-current power supply "of2" is connected to the second power receiving terminal "TAC2" at a negative electrode thereof and is configured to output a voltage (a first offset voltage) having the same magnitude as that of the voltage output by the first direct-current power supply "of1".

The second comparator "COM2" compares a second voltage at a positive electrode of the second direct-current power supply "of2" and the ground voltage. The second comparator "COM2" outputs a signal "S2" at a "High" level if the second voltage is lower than the ground voltage. On the other hand, the second comparator "COM2" outputs the signal "S2" at a "Low" level if the second voltage is equal to or higher than the ground voltage, for example.

The third controlling circuit "X3" is configured to output a third control signal to a gate of the first nMOS transistor "N1" based on the current detection signal "SD" and a result of detection by the first voltage detecting circuit "DV1" to control the first nMOS transistor "N1".

As shown in FIG. 1, the third controlling circuit "X3" has a third inverter "IN3", a first AND circuit "A1" and a first driver "D1", for example.

The third inverter "IN3" is configured to receive the current detection signal "SD".

The first AND circuit "A1" is connected to the output of the first comparator "COM1" and an output of the third inverter "IN3" at inputs thereof.

The first driver "D1" is connected to an output of the first AND circuit "A1" at an input thereof and to the gate of the first nMOS transistor "N1" at an output thereof. The first driver "D1" amplifies an input signal and outputs the amplified signal.

The fourth controlling circuit "X4" is configured to output a fourth control signal to a gate of the second nMOS transistor "N2" based on the current detection signal "SD" and a result of detection by the second voltage detecting circuit "DV2" to control the second nMOS transistor "N2".

The fourth controlling circuit "X4" has a fourth inverter "IN4", a second AND circuit "A2" and a second driver "D2".

The fourth inverter "IN4" is configured to receive the current detection signal "SD".

The second AND circuit "A2" is connected to the output of the second comparator "COM2" and an output of the fourth inverter "IN4" at inputs thereof.

The second driver "D2" is connected to an output of the second AND circuit "A2" at an input thereof and to the gate of the second nMOS transistor "N2" at an output thereof. The second driver "D2" amplifies an input signal and outputs the amplified signal.

In a case where the first voltage detecting circuit "DV1" detects that a voltage "AC1" at the first power receiving terminal "TAC1" (plus the first offset voltage) is lower than the ground voltage at the ground "PGND", the second controlling circuit "X2" is configured to turn on the second pMOS transistor "P2", and the third controlling circuit "X3" is configured to turn on the first nMOS transistor "N1".

On the other hand, in a case where the first voltage detecting circuit "DV1" detects that the voltage "AC1" at the first power receiving terminal "TAC1" (plus the first offset voltage) is equal to or higher than the ground voltage, the second controlling circuit "X2" is configured to turn off the second pMOS transistor "P2", and the third controlling circuit "X3" is configured to turn off the first nMOS transistor "N1".

In a case where the second voltage detecting circuit "DV2" detects that a voltage "AC2" at the second power receiving terminal "TAC2" (plus the first offset voltage) is lower than the ground voltage, the first controlling circuit "X1" is configured to turn on the first pMOS transistor "P1", and the fourth controlling circuit "X4" is configured to turn on the second nMOS transistor "N2".

On the other hand, in a case where the second voltage detecting circuit "DV2" detects that the voltage "AC2" at the second power receiving terminal "TAC2" (plus the first offset voltage) is equal to or higher than the ground voltage, the first controlling circuit "X1" is configured to turn off the first pMOS transistor "P1", and the fourth controlling circuit "X4" is configured to turn off the second nMOS transistor "N2".

The third controlling circuit "X3" and the fourth controlling circuit "X4" receives not only the results of detection by the first and second voltage detecting circuits "DV1" and "DV2" but also the current detection signal "SD". That is, if the load current "IOUT" is lower than the threshold, the third controlling circuit "X3" outputs the third control signal to forcedly turn off the first nMOS transistor "N1", and the fourth controlling circuit "X4" outputs the fourth control signal to forcedly turn off the second nMOS transistor "N2".

Figure 2:
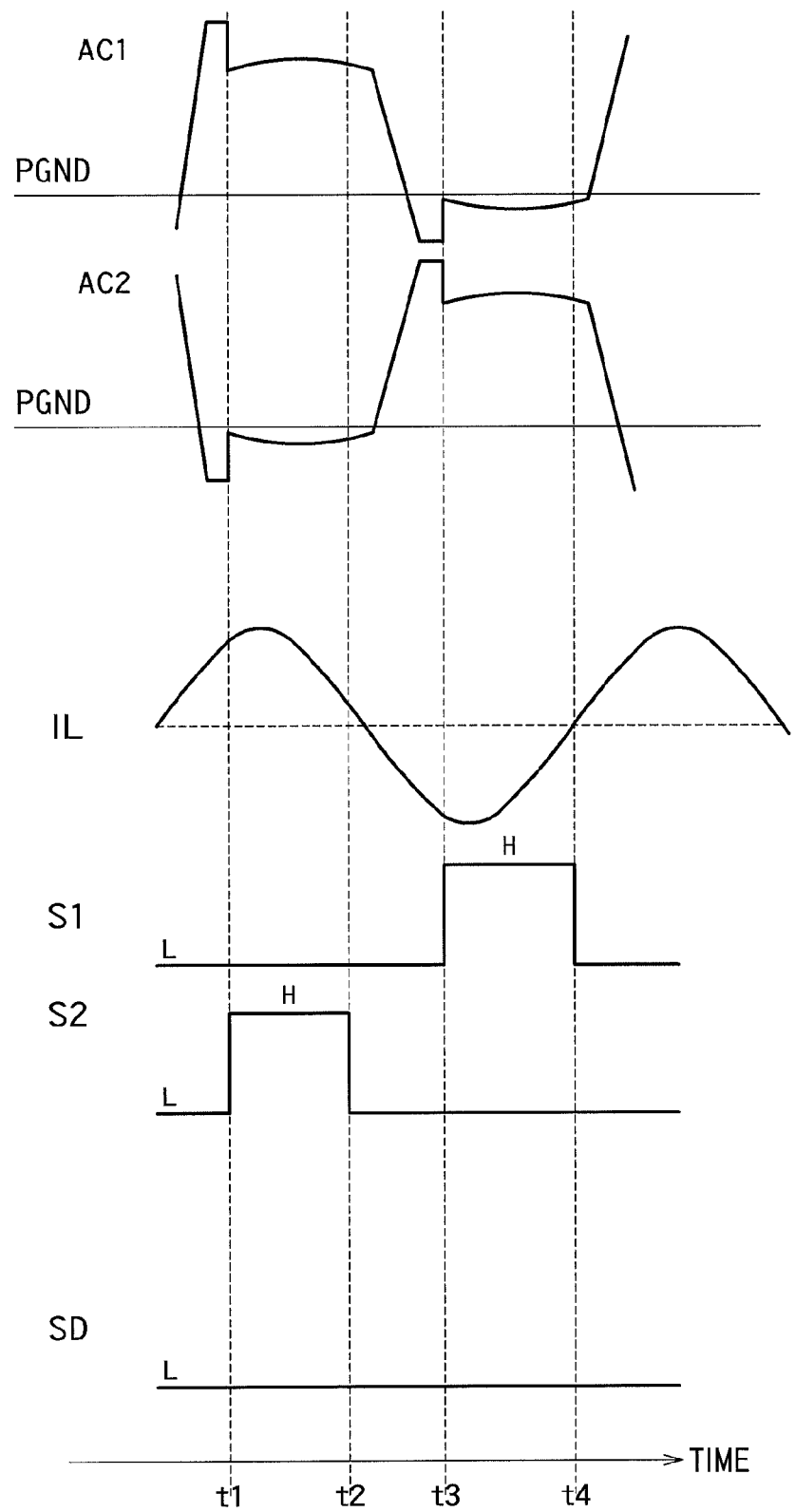
FIG. 2 is a waveform diagram showing examples of signals involved in the normal operation of the rectifying apparatus 100.

Next, an example of an operation of the rectifying apparatus 100 configured as described above will be described. First, an example of a normal operation of the rectifying apparatus 100 will be described. FIG. 2 is a waveform diagram showing examples of signals involved in the normal operation of the rectifying apparatus 100. Signal waveforms "AC1" and "AC2" in FIG. 2 are waveforms of the voltages "AC1" and "AC2" plus the offset voltage, respectively. The same holds true for FIGS. 3, 6 and 7.

In this example, the load current "IOUT" is equal to or higher than the threshold, and therefore, the current detecting circuit "DI" outputs the current detection signal "SD" at the "Low" level.

For example, when a current flows from the second power receiving terminal "TAC2" to the first power receiving terminal "TAC1" via the power receiving coil "L1", the voltage "AC2" becomes lower than the ground voltage "PGND".

The second voltage detecting circuit "DV2" then detects that the voltage "AC2" at the second power receiving terminal "TAC2" (plus the first offset voltage) is lower than the ground voltage and outputs the signal "S2" at the "High" level. In response to this, the first controlling circuit "X1" turns on the first pMOS transistor "P1", and the fourth controlling circuit "X4" turns on the second nMOS transistor "N2" (at a time "t1").

At the same time, the first voltage detecting circuit "DV1" detects that the voltage "AC1" at the first power receiving terminal "TAC1" (plus the first offset voltage) is equal to or higher than the ground voltage and outputs the signal "S1" at the "Low" level. In response to this, the second controlling circuit "X2" turns off the second pMOS transistor "P2", and the third controlling circuit "X3" turns off the first nMOS transistor "N1" (at the time "t1").

In this way, the first pMOS transistor "P1" and the second nMOS transistor "N2" are turned on, and a current flows to the output terminal "TOUT".

The second voltage detecting circuit "DV2" then detects that the voltage "AC2" at the second power receiving terminal "TAC2" (plus the first offset voltage) is equal to or higher than the ground voltage and outputs the signal "S2" at the "Low" level. In response to this, the first controlling circuit "X1" turns off the first pMOS transistor "P1", and the fourth controlling circuit "X4" turns off the second nMOS transistor "N2" (at a time "t2").

A current then flows from the first power receiving terminal "TAC1" to the second power receiving terminal "TAC2" via the power receiving coil "L1", and the voltage "AC1" becomes lower than the ground voltage "PGND".

The first voltage detecting circuit "DV1" then detects that the voltage "AC1" at the first power receiving terminal "TAC1" (plus the first offset voltage) is lower than the ground voltage and outputs the signal "S1" at the "High" level. In response to this, the second controlling circuit "X2" turns on the second pMOS transistor "P2", and the third controlling circuit "X3" turns on the first nMOS transistor "N1" (at a time "t3").

At the same time, the second voltage detecting circuit "DV2" detects that the voltage "AC2" at the second power receiving terminal "TAC2" (plus the first offset voltage) is equal to or higher than the ground voltage and outputs the signal "S2" at the "Low" level. In response to this, the first controlling circuit "X1" turns off the first pMOS transistor "P1", and the fourth controlling circuit "X4" turns off the second nMOS transistor "N2" (at the time "t3").

In this way, the second pMOS transistor "P2" and the first nMOS transistor "N1" are turned on, and a current flows to the output terminal "TOUT".

The first voltage detecting circuit "DV1" then detects that the voltage "AC1" at the first power receiving terminal "TAC1" (plus the first offset voltage) is equal to or higher than the ground voltage and outputs the signal "S1" at the "Low" level. In response to this, the second controlling circuit "X2" turns off the second pMOS transistor "P2", and the third controlling circuit "X3" turns off the first nMOS transistor "N1" (at a time "t4").

In the rectifying apparatus 100, the first and second voltage detecting circuits "DV1" and "DV2" detect the voltages of the first and second nMOS transistors "N1" and "N2", and the first and second pMOS transistors "P1" and "P2" and the first and second nMOS transistors "N1" and "N2" are controlled based on the detection results.

By repeating the operation described above, the rectifying apparatus 100 achieves full-wave rectification of the signal resonated by the power receiving coil "L1" and the power receiving capacitor "C1" to produce a DC voltage and outputs the DC voltage to the output terminal "TOUT".

The voltage drop of a MOS transistor due to the on-resistance is much lower than the forward voltage of a diode, so that the rectifying apparatus 100 has improved power loss.

Figure 3:
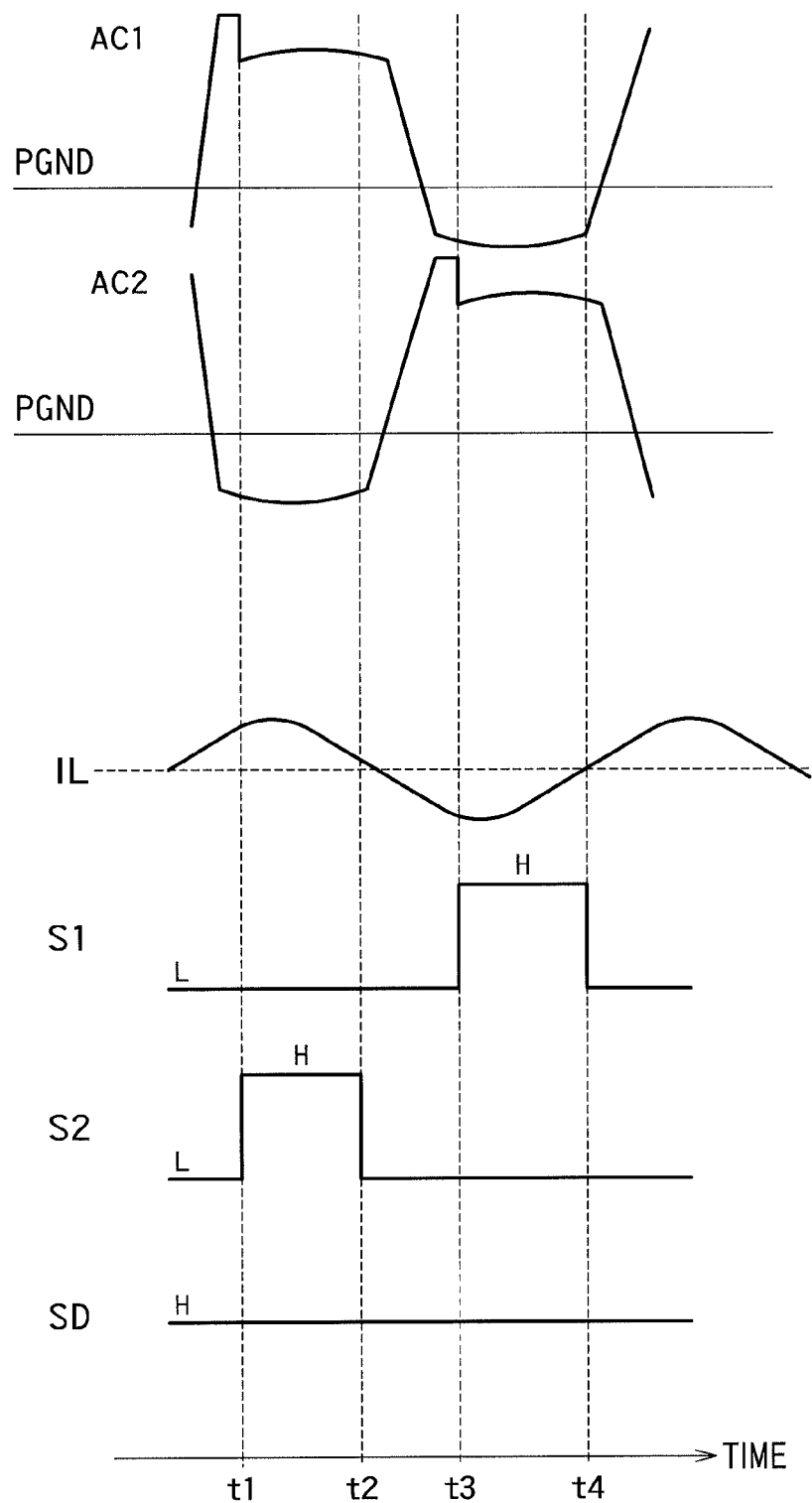
FIG. 3 is a waveform diagram showing examples of the signals in the case where the load on the rectifying apparatus 100 is light.

Next, an example of the operation of the rectifying apparatus 100 in the case where the load current is lower than the threshold when the load is light will be described. FIG. 3 is a waveform diagram showing examples of the signals in the case where the load on the rectifying apparatus 100 is light.

As shown in FIG. 3, the waveforms of the first and second control signals "S1" and "S2" from the time "t1" to the time "t4" are the same as those in the normal operation shown in FIG. 2.

Since the load current "IOUT" is lower than the threshold (the load is light), the current detecting circuit "DI" outputs the current detection signal "SD" at the "High" level that indicates that the load current "IOUT" is lower than the threshold.

In this case, the third controlling circuit "X3" outputs the third control signal at the "Low" level to forcedly turn off the first nMOS transistor "N1". The fourth controlling circuit "X4" outputs the fourth control signal at the "Low" level to forcedly turn off the second nMOS transistor "N2".

As a result, the parasitic diodes "Z3" and "Z4" in the first and second nMOS transistors "N1" and "N2" operate, and a current flows. That is, a path of backflow of the load current "IOUT" can be cut off by the parasitic diodes "Z3" and "Z4".

Figure 4:
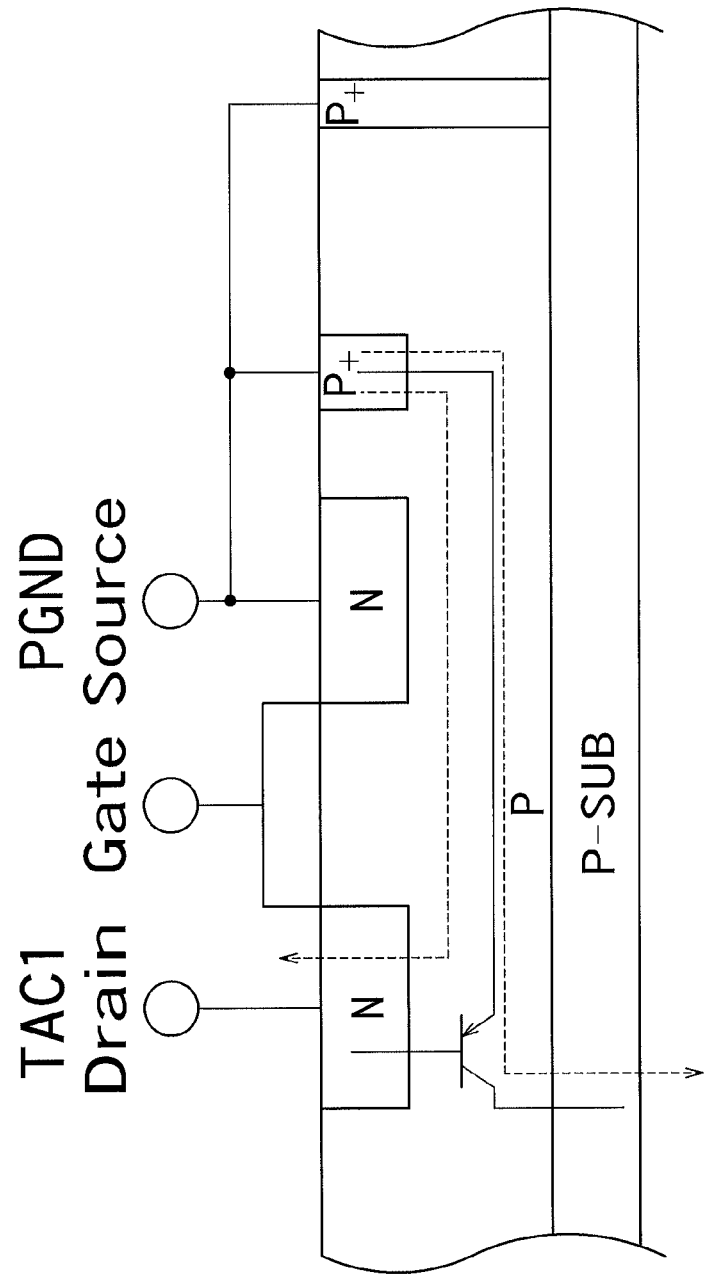
FIG. 4 is a cross-sectional view of the first nMOS transistor "N1" used in the rectifying apparatus 100.

FIG. 4 is a cross-sectional view of the first nMOS transistor "N1" used in the rectifying apparatus 100. Note that the second nMOS transistor "N2" has the same cross section. As shown in FIG. 4, the first nMOS transistor "N1" configured in this way operates as a diode when the potential at the first power receiving terminal "TAC1" is lower than the potential at the ground "PGND". The ground "PGND" is at the same potential as a substrate "P-Sub", and therefore no current flows through a parasitic PNP-type bipolar transistor.

Therefore, no current leaks to the substrate "P-Sub", no significant current loss occurs, and a backflow can be prevented when the load current "IOUT" is small.

As described above, the rectifying apparatus according to the first embodiment has an improved efficiency and can prevent a backflow from the output terminal.

Second Embodiment

Figure 5:
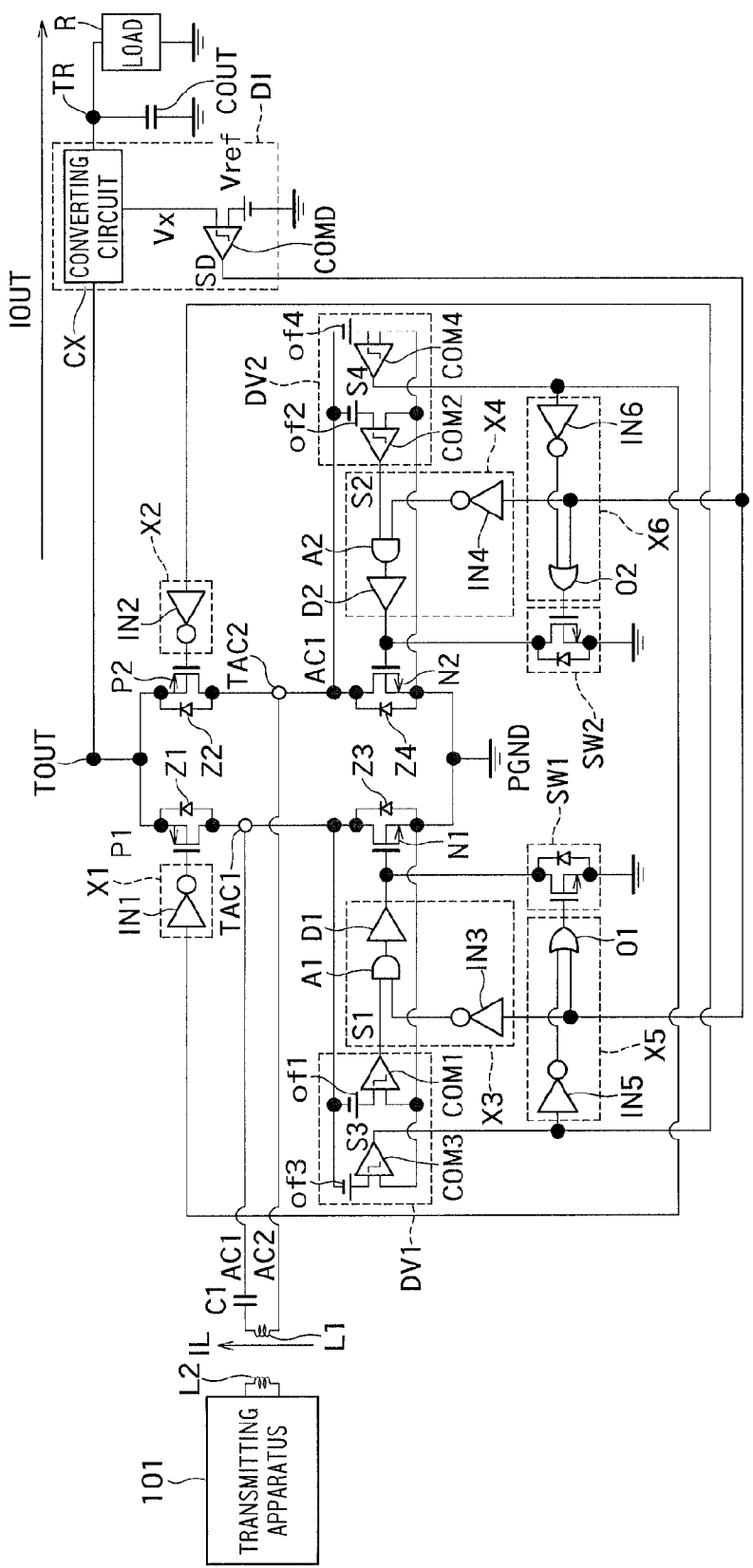
FIG. 5 is a circuit diagram showing an example of a configuration of a rectifying apparatus 200 according to a second embodiment.

FIG. 5 is a circuit diagram showing an example of a configuration of a rectifying apparatus 200 according to a second embodiment. In FIG. 5, the same reference symbols as those in FIG. 1 denote the same components as those in the first embodiment, and descriptions of those components will be omitted.

As shown in FIG. 5, the first voltage detecting circuit "DV1" has the first direct-current power supply "of1", a third direct-current power supply "of3", the first comparator "COM1" and a third comparator "COM3". That is, the first voltage detecting circuit "DV1" in the second embodiment differs from the first voltage detecting circuit "DV1" in the first embodiment in that it further has the third direct-current power supply "of3" and the third comparator "COM3".

The first direct-current power supply "of1" is connected to the first power receiving terminal "TAC1" at the negative electrode thereof.

The first comparator "COM1" compares the first voltage at the positive electrode of the first direct-current power supply "of1" and the ground voltage. The first comparator "COM1" outputs the signal "S1" at the "High" level if the first voltage is lower than the ground voltage and outputs the signal "S1" at the "Low" level if the first voltage is equal to or higher than the ground voltage.

The third direct-current power supply "of3" is connected to the first power receiving terminal "TAC1" at a negative electrode thereof. The third direct-current power supply "of3" outputs a voltage (a second offset voltage) greater than the voltage output by the first direct-current power supply "of1".

The third comparator "COM3" compares a third voltage at a positive electrode of the third direct-current power supply "of3" and the ground voltage. The third comparator "COM3" outputs a signal "S3" at a "High" level if the third voltage is lower than the ground voltage and outputs the signal "S3" at a "Low" level if the third voltage is equal to or higher than the ground voltage.

As shown in FIG. 5, the second voltage detecting circuit "DV2" has the second direct-current power supply "of2", the second comparator "COM2", a fourth direct-current power supply "of4" and a fourth comparator "COM4".

The second direct-current power supply "of2" is connected to the second power receiving terminal "TAC2" at the negative electrode thereof. The second direct-current power supply "of2" is configured to output the voltage (the first offset voltage) having the same magnitude as that of the voltage output by the first direct-current power supply "of1".

The second comparator "COM2" compares the second voltage at the positive electrode of the second direct-current power supply "of2" and the ground voltage. The second comparator "COM2" outputs the signal "S2" at the "High" level if the second voltage is lower than the ground voltage and outputs the signal "S2" at the "Low" level if the second voltage is equal to or higher than the ground voltage.

The fourth direct-current power supply "of4" is connected to the second power receiving terminal "TAC2" at a negative electrode thereof. The fourth direct-current power supply "of4" is configured to output the voltage (the second offset voltage) having the same magnitude as the voltage output by the third direct-current power supply "of3".

The second offset voltage is lower than the first offset voltage described above.

The fourth comparator "COM4" compares a fourth voltage at a positive electrode of the fourth direct-current power supply "of4" and the ground voltage. The fourth comparator "COM4" outputs a signal "S4" at a "High" level if the fourth voltage is lower than the ground voltage and outputs the signal "S4" at a "Low" level if the fourth voltage is equal to or higher than the ground voltage.

As shown in FIG. 5, the first controlling circuit "X1" has the first inverter "IN1", for example.

The first inverter "IN1" is connected to an output of the fourth comparator "COM4" at the input thereof and to the gate of the first pMOS transistor "P1" at the output thereof.

As shown in FIG. 5, the second controlling circuit "X2" has the second inverter "IN2", for example.

The second inverter "IN2" is connected to an output of the third comparator "COM3" at the input thereof and to the gate of the second pMOS transistor "P2" at the output thereof.

As shown in FIG. 5, the third controlling circuit "X3" has the third inverter "IN3", the first AND circuit "A1" and the first driver "D1", for example.

The third inverter "IN3" is configured to receive the current detection signal "SD".

The first AND circuit "A1" is connected to the output of the first comparator "COM1" and the output of the third inverter "IN3" at the inputs thereof.

The first driver "D1" is connected to the output of the first AND circuit "A1" at the input thereof and to the gate of the first nMOS transistor "N1" at the output thereof.

As shown in FIG. 5, the fourth controlling circuit "X4" has the fourth inverter "IN4", the second AND circuit "A2" and the second driver "D2", for example.

The fourth inverter "IN4" is configured to receive the current detection signal "SD".

The second AND circuit "A2" is connected to the output of the second comparator "COM2" and the output of the fourth inverter "IN4" at the inputs thereof.

The second driver "D2" is connected to the output of the second AND circuit "A2" at the input thereof and to the gate of the second nMOS transistor "N2" at the output thereof.

As shown in FIG. 5, the rectifying apparatus 200 differs from the rectifying apparatus 100 according to the first embodiment in that it further includes a first switch element "SW1", a second switch element "SW2", a fifth controlling circuit "X5" and a sixth controlling circuit "X6", for example.

The first switch element "SW1" is connected to establish and break the connection between the gate of the first nMOS transistor "N1" and the ground "PGND".

As shown in FIG. 5, the first switch element "SW1" is an nMOS transistor that is connected to the gate of the first nMOS transistor "N1" at a drain thereof and to the ground "PGND" at a source thereof and receives a fifth control signal at a gate thereof, for example.

The fifth controlling circuit "X5" receives the current detection signal "SD" and the result of detection by the first voltage detecting circuit "DV1" (signal "S3") and output the fifth control signal.

As shown in FIG. 5, the fifth controlling circuit "X5" has a fifth inverter "IN5" and a first OR circuit "O1", for example.

The fifth inverter "IN5" is connected to the output of the third comparator "COM3" at an input thereof.

The first OR circuit "O1" receives the current detection signal "SD" and an output of the fifth inverter "IN5" and outputs the fifth control signal.

The second switch element "SW2" is connected to establish and break the connection between the gate of the second nMOS transistor "N2" and the ground "PGND".

As shown in FIG. 5, the second switch element "SW2" is an nMOS transistor that is connected to the gate of the second nMOS transistor "N2" at a drain thereof and to the ground "PGND" at a source thereof and receives a sixth control signal at a gate thereof, for example.

The sixth controlling circuit "X6" receives the current detection signal "SD" and the result of detection by the second voltage detecting circuit "DV2" (signal "S4") and output the sixth control signal.

The sixth controlling circuit "X6" has a sixth inverter "IN6" and a second OR circuit "O2".

The sixth inverter "IN6" is connected to the output of the fourth comparator "COM4" at an input thereof.

The second OR circuit "O2" receives the current detection signal "SD" and an output of the sixth inverter "IN6" and outputs the sixth control signal.

In the case where the first voltage detecting circuit "DV1" detects that the voltage at the first power receiving terminal "TAC1" is lower than the ground voltage at the ground "PGND", the second controlling circuit "X2" turns on the second pMOS transistor "P2", and after that, the third controlling circuit "X3" turns on the first nMOS transistor "N1".

On the other hand, in the case where the first voltage detecting circuit "DV1" detects that the voltage at the first power receiving terminal "TAC1" is equal to or higher than the ground voltage, the third controlling circuit "X3" is configured to turn off the first nMOS transistor "N1", and after that, the second controlling circuit "X2" is configured to turn off the second pMOS transistor "P2".

In the case where the second voltage detecting circuit "DV2" detects that the voltage at the second power receiving terminal "TAC2" is lower than the ground voltage, the first controlling circuit "X1" is configured to turn on the first pMOS transistor "P1", and after that, the fourth controlling circuit "X4" is configured to turn on the second nMOS transistor "N2".

On the other hand, in the case where the second voltage detecting circuit "DV2" detects that the voltage at the second power receiving terminal "TAC2" is equal to or higher than the ground voltage, the fourth controlling circuit "X4" is configured to turn off the second nMOS transistor "N2", and after that, the first controlling circuit "X1" is configured to turn off the first pMOS transistor "P1".

In the operation of the first and second voltage detecting circuits "DV1" and "DV2" described above, more specifically, the first and second voltage detecting circuits "DV1" and "DV2" compare the voltages at the first and second power receiving terminals "TAC1" and "TAC2" minus the first and second offset voltages, respectively, with the ground voltage.

The remainder of the configuration of the rectifying apparatus 200 is the same as that of the rectifying apparatus 100 according to the first embodiment.

Figure 6:
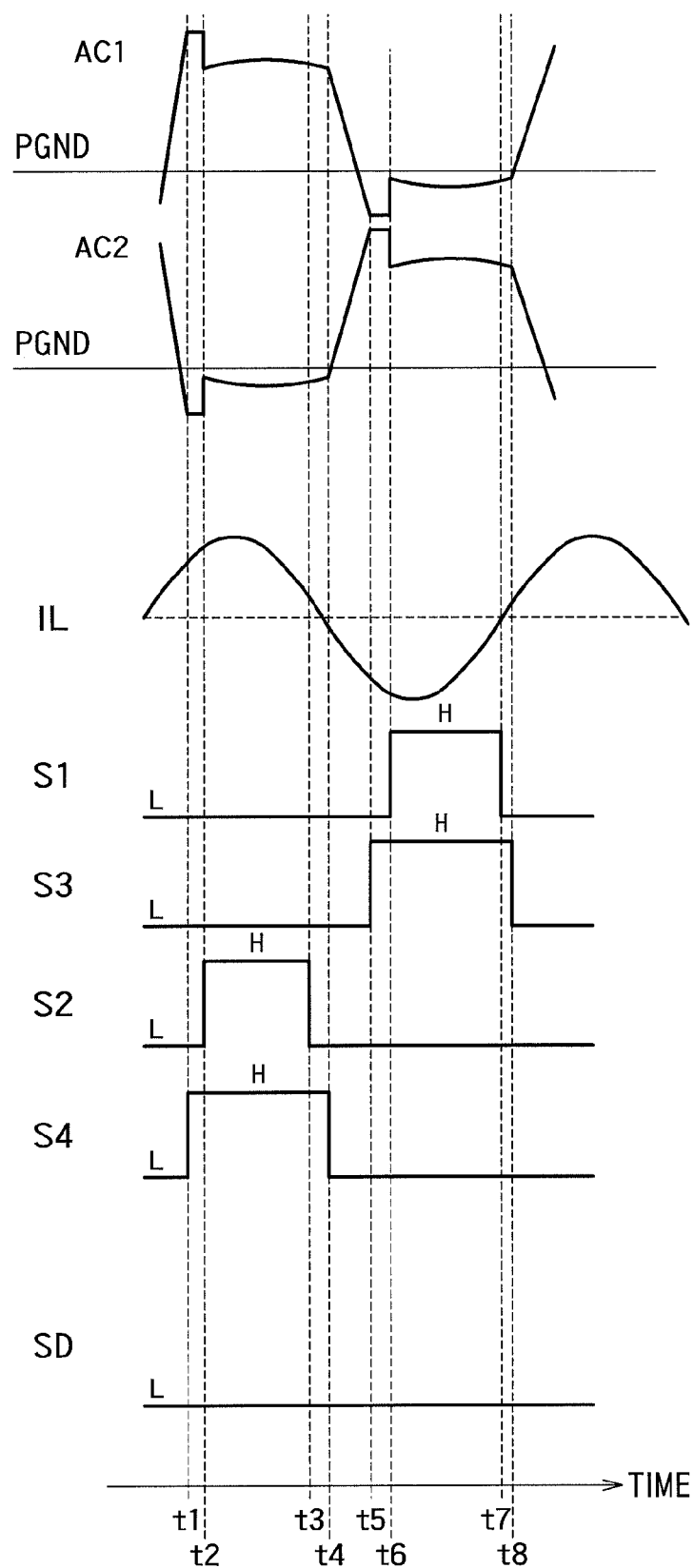
FIG. 6 is a waveform diagram showing examples of signals involved in the normal operation of the rectifying apparatus 200.

Next, an example of an operation of the rectifying apparatus 200 configured as described above will be described. First, an example of a normal operation of the rectifying apparatus 200 will be described. FIG. 6 is a waveform diagram showing examples of signals involved in the normal operation of the rectifying apparatus 200.

In this example, the load current "IOUT" is equal to or higher than the threshold, and therefore, the current detecting circuit "DI" outputs the current detection signal "SD" at the "Low" level.

As described above, in the normal operation, the current detection signal "SD" is output at the "Low" level and indicates that the load current "IOUT" is equal to or higher than the threshold. In this case, the fifth controlling circuit "X5" turns off the first switch element "SW1", and the sixth controlling circuit "X6" turns off the second switch element "SW2".

For example, when a current flows from the second power receiving terminal "TAC2" to the first power receiving terminal "TAC1" via the power receiving coil "L1", the voltage "AC2" becomes lower than the ground voltage "PGND".

The fourth comparator "COM4" in the second voltage detecting circuit "DV2" then detects that the voltage at the second power receiving terminal "TAC2" (plus the second offset voltage) is lower than the ground voltage and outputs the signal "S4" at the "High" level (at a time "t1"). In response to this, the first controlling circuit "X1" turns on the first pMOS transistor "P1".

The second comparator "COM2" in the second voltage detecting circuit "DV2" then detects that the voltage at the second power receiving terminal "TAC2" (plus the first offset voltage) is lower than the ground voltage and outputs the signal "S2" at the "High" level (at a time "t2"). In response to this, the fourth controlling circuit "X4" turns on the second nMOS transistor "N2".

The second comparator "COM2" in the second voltage detecting circuit "DV2" then detects that the voltage at the second power receiving terminal "TAC2" (plus the first offset voltage) is equal to or higher than the ground voltage and outputs the signal "S2" at the "Low" level (at a time "t3"). In response to this, the fourth controlling circuit "X4" turns off the second nMOS transistor "N2".

The fourth comparator "COM4" in the second voltage detecting circuit "DV2" then detects that the voltage at the second power receiving terminal "TAC2" (plus the second offset voltage) is equal to or higher than the ground voltage and outputs the signal "S4" at the "Low" level (at a time "t4").

In response to this, the first controlling circuit "X1" turns off the first pMOS transistor "P1".

A current then flows from the first power receiving terminal "TAC1" to the second power receiving terminal "TAC2" via the power receiving coil "L1", and the voltage "AC1" becomes lower than the ground voltage "PGND".

The third comparator "COM3" in the first voltage detecting circuit "DV1" then detects that the voltage at the first power receiving terminal "TAC1" (plus the second offset voltage) is lower than the ground voltage and outputs the signal "S3" at the "High" level (at a time "t5"). In response to this, the second controlling circuit "X2" turns on the second pMOS transistor "P2".

The first comparator "COM1" in the first voltage detecting circuit "DV1" then detects that the voltage at the first power receiving terminal "TAC1" (plus the first offset voltage) is lower than the ground voltage at the ground "PGND" and outputs the signal "S1" at the "High" level (at a time "t6"). In response to this, the third controlling circuit "X3" turns on the first nMOS transistor "N1".

The first comparator "COM1" in the first voltage detecting circuit "DV1" then detects that the voltage at the first power receiving terminal "TAC1" (plus the first offset voltage) is equal to or higher than the ground voltage and outputs the signal "S1" at the "Low" level. In response to this, the third controlling circuit "X3" turns off the first nMOS transistor "N1".

The third comparator "COM3" in the first voltage detecting circuit "DV1" then detects that the voltage at the first power receiving terminal "TAC1" (plus the second offset voltage) is equal to or higher than the ground voltage and outputs the signal "S3" at the "Low" level. In response to this, the second controlling circuit "X2" turns off the second pMOS transistor "P2".

In the rectifying apparatus 200, the first and second voltage detecting circuits "DV1" and "DV2" detect the voltages of the first and second nMOS transistors "N1" and "N2", and the first and second pMOS transistors "P1" and "P2" and the first and second nMOS transistors "N1" and "N2" are controlled based on the detection results.

By repeating the operation described above, the rectifying apparatus 200 achieves full-wave rectification of the signal resonated by the power receiving coil "L1" and the power receiving capacitor "C1" to produce a DC voltage and outputs the DC voltage to the output terminal "TOUT".

The voltage drop of a MOS transistor is much lower than the forward voltage of a diode, so that the rectifying apparatus 200 has improved power loss.

Figure 7:
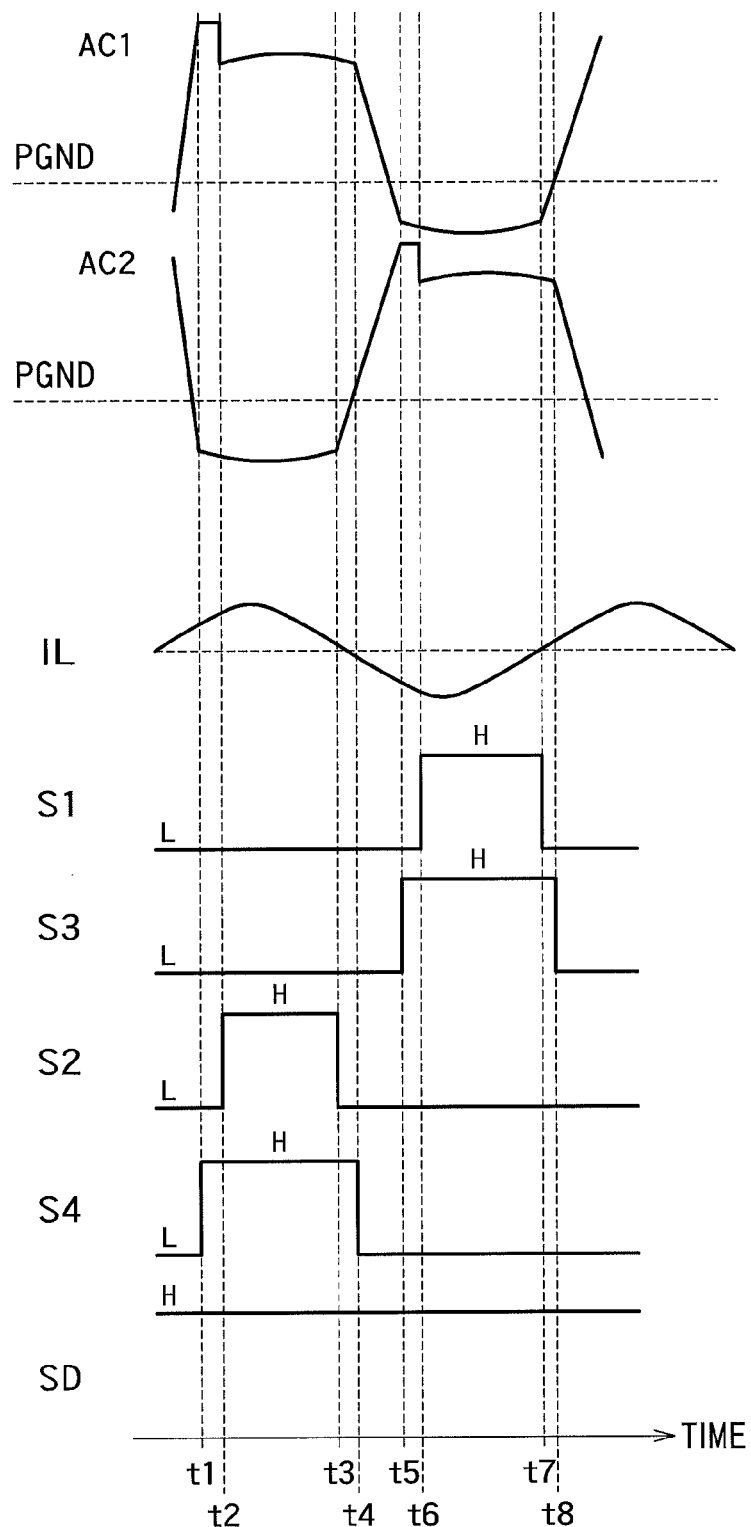
FIG. 7 is a waveform diagram showing examples of the signals in the case where the load on the rectifying apparatus 200 is light.

Next, an example of the operation of the rectifying apparatus 200 in the case where the load current is lower than the threshold when the load is light will be described. FIG. 7 is a waveform diagram showing examples of the signals in the case where the load on the rectifying apparatus 200 is light.

As shown in FIG. 7, the waveforms of the signals "S1" and "S2" from the time "t1" to the time "t4" are the same as those in the normal operation shown in FIG. 6.

Since the load current "IOUT" is lower than the threshold (the load is light), the current detecting circuit "DI" outputs the current detection signal "SD" at the "High" level that indicates that the load current "IOUT" is lower than the threshold.

In this case, the third controlling circuit "X3" outputs the third control signal to forcedly turn off the first nMOS transistor "N1", and the fourth controlling circuit "X4" outputs the fourth control signal to forcedly turn off the second nMOS transistor "N2".

In addition, the fifth controlling circuit "X5" turns on the first switch element "SW1", and the sixth controlling circuit "X6" turns on the second switch element "SW2".

As a result, the parasitic diodes "Z3" and "Z4" in the first and second nMOS transistors "N1" and "N2" operate, and a current flows. That is, a path of backflow of the load current "IOUT" can be cut off by the parasitic diodes "Z3" and "Z4".

As shown in FIG. 4 described earlier, the first nMOS transistor "N1" configured as described above operates as a diode when the potential at the first power receiving terminal "TAC1" is lower than the potential at the ground "PGND". The ground "PGND" is at the same potential as the substrate "P-Sub", and therefore no current flows through a parasitic PNP-type bipolar transistor.

Therefore, no current leaks to the substrate "P-Sub", no significant current loss occurs, and a backflow can be prevented when the load current "IOUT" is small.

The remainder of the operation of the rectifying apparatus 200 is the same as that of the rectifying apparatus 100 according to the first embodiment.

As described above, the rectifying apparatus according to the second embodiment has an improved efficiency and can prevent a backflow from the output terminal.

The rectifying apparatus according to this embodiment has the following aspects.

In the rectifying apparatus according to this embodiment, in the case where the current detection signal indicates that the load current is equal to or higher than the threshold, the fifth controlling circuit turns off the first switch element, and the sixth controlling circuit turns off the second switch element.

Furthermore, in the rectifying apparatus according to this embodiment, in the case where the current detection signal indicates that the load current is lower than the threshold, the third controlling circuit forcedly turns off the first nMOS transistor, the fourth controlling circuit forcedly turns off the second nMOS transistor, the fifth controlling circuit turns on the first switch element, and the sixth controlling circuit turns on the second switch element.

Furthermore, in the rectifying apparatus according to this embodiment, the fifth controlling circuit has the fifth inverter connected to the output of the third comparator at the input thereof and the first OR circuit that receives the current detection signal at the input thereof and is connected to the output of the fifth inverter at the input thereof and to the control terminal of the first switch element at the output thereof, and the sixth controlling circuit has the sixth inverter connected to the output of the fourth comparator at the input thereof and the second OR circuit that receives the current detection signal at the input thereof and is connected to the output of the sixth inverter at the input thereof and to the control terminal of the second switch element at the output thereof.

Furthermore, in the rectifying apparatus according to this embodiment, the first switch element is an nMOS transistor connected to the gate of the first nMOS transistor at the drain thereof, to the ground at the source thereof and to the output of the first OR circuit at the gate thereof, and the second switch element is an nMOS transistor connected to the gate of the second nMOS transistor at the drain thereof, to the ground at the source thereof and to the output of the second OR circuit at the gate thereof.

Furthermore, the rectifying apparatus according to this embodiment further has an output capacitor connected between the load terminal and the ground.

Furthermore, in the rectifying apparatus according to this embodiment, the current detecting circuit sets the current detection signal at the "High" level in the case where the load current is lower than the threshold and sets the current detection signal at the "Low" level in the case where the load current is equal to or higher than the threshold.

Furthermore, in the rectifying apparatus according to this embodiment, the current detecting circuit has the converting circuit that outputs a converted voltage responsive to the load current and the current detecting comparator that compares the converted voltage with the preset reference voltage and outputs a signal responsive to the comparison result as the current detection signal.

Furthermore, in the rectifying apparatus according to this embodiment, the current detecting circuit further has the reference direct-current power supply that is connected to the ground at the negative electrode thereof and outputs the reference voltage.

Furthermore, in the rectifying apparatus according to this embodiment, the current detecting comparator sets the current detection signal at the "High" level in the case where the converted voltage is lower than the reference voltage and sets the current detection signal at the "Low" level in the case where the converted voltage is equal to or higher than the reference voltage.

Furthermore, the rectifying apparatus according to this embodiment transmits a signal containing information based on the load current from the power receiving coil to the power transmitting coil in the power transmitting apparatus, and the power transmitting apparatus obtains, by envelope detection, the information based on the load current from the signal received at the power transmitting coil.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A rectifying apparatus that receives electric power transmitted from a power transmitting apparatus by wireless power transmission, and rectifies a resulting current and outputs the rectified current, comprising:
   a power receiving coil connected between a first power receiving terminal and a second power receiving terminal, and configured to be electromagnetically coupled with a power transmitting coil in the power transmitting apparatus;
   a power receiving capacitor connected in series with the power receiving coil between the first power receiving terminal and the second power receiving terminal;
   a first pMOS transistor connected to an output terminal at a source thereof and to the first power receiving terminal at a drain thereof;
   a second pMOS transistor connected to the output terminal at a source and to the second power receiving terminal at a drain thereof;
   a first nMOS transistor connected to the first power receiving terminal at a drain thereof and to a fixed potential at a source thereof;
   a second nMOS transistor connected to the second power receiving terminal at a drain thereof and to the fixed potential at a source thereof;
   a current detecting circuit that detects a load current flowing between a load terminal to which a load is connected and the output terminal and outputs a current detection signal responsive to a result of comparison between the load current and a threshold;
a first voltage detecting circuit that detects a voltage between the first power receiving terminal and the fixed potential or between the output terminal and the first power receiving terminal;
a second voltage detecting circuit that detects a voltage between the second power receiving terminal and the fixed potential in a case where the first voltage detecting circuit detects the voltage between the first power receiving terminal and the fixed potential, and detects a voltage between the output terminal and the second power receiving terminal in a case where the first voltage detecting circuit detects the voltage between the output terminal and the first power receiving terminal;
a first controlling circuit that controls the first pMOS transistor based on a result of detection by the second voltage detecting circuit;
a second controlling circuit that controls the second pMOS transistor based on a result of detection by the first voltage detecting circuit;
a third controlling circuit that controls the first nMOS transistor based on the current detection signal and the result of detection by the first voltage detecting circuit; and
a fourth controlling circuit that controls the second nMOS transistor based on the current detection signal and the result of detection by the second voltage detecting circuit.

2. The rectifying apparatus according to claim 1, wherein the second controlling circuit turns on the second pMOS transistor, and the third controlling circuit turns on the first nMOS transistor in a case where the first voltage detecting circuit detects that the voltage at the first power receiving terminal is lower than the fixed potential,
the second controlling circuit turns off the second pMOS transistor, and the third controlling circuit turns off the first nMOS transistor in a case where the first voltage detecting circuit detects that the voltage at the first power receiving terminal is equal to or higher than the fixed potential,
the first controlling circuit turns on the first pMOS transistor, and the fourth controlling circuit turns on the second nMOS transistor in a case where the second voltage detecting circuit detects that the voltage at the second power receiving terminal is lower than the fixed potential, and
the first controlling circuit turns off the first pMOS transistor, and the fourth controlling circuit turns off the second nMOS transistor in a case where the second voltage detecting circuit detects that the voltage at the second power receiving terminal is equal to or higher than the fixed potential.

3. The rectifying apparatus according to claim 1, wherein in a case where the current detection signal indicates that the load current is lower than the threshold,
the third controlling circuit forcedly turns off the first nMOS transistor, and the fourth controlling circuit forcedly turns off the second nMOS transistor.

4. The rectifying apparatus according to claim 1, wherein the second controlling circuit turns on the second pMOS transistor, and after that, the third controlling circuit turns on the first nMOS transistor in a case where the first voltage detecting circuit detects that the voltage at the first power receiving terminal is lower than a fixed potential,
the third controlling circuit turns off the first nMOS transistor, and after that, the second controlling circuit turns off the second pMOS transistor in a case where the first voltage detecting circuit detects that the voltage at the first power receiving terminal is equal to or higher than the fixed potential,
the first controlling circuit turns on the first pMOS transistor, and after that, the fourth controlling circuit turns on the second nMOS transistor in a case where the second voltage detecting circuit detects that the voltage at the second power receiving terminal is lower than the fixed potential, and
the fourth controlling circuit turns off the second nMOS transistor, and after that, the first controlling circuit turns off the first pMOS transistor in a case where the second voltage detecting circuit detects that the voltage at the second power receiving terminal is equal to or higher than the fixed potential.

5. The rectifying apparatus according to claim 4, further comprising:
a first switch element connected between a gate of the first nMOS transistor and the ground;
a fifth controlling circuit that controls the first switch element based on the current detection signal and the result of detection by the first voltage detecting circuit;
a second switch element connected between a gate of the second nMOS transistor and the fixed potential; and
a sixth controlling circuit that controls the second switch element based on the current detection signal and the result of detection by the second voltage detecting circuit.

6. The rectifying apparatus according to claim 4, wherein the first voltage detecting circuit has:
a first direct-current power supply connected to the first power receiving terminal at a negative electrode thereof;
a first comparator that compares a first voltage at a positive electrode of the first direct-current power supply and the fixed potential and outputs a signal at a "High" level in a case where the first voltage is lower than the fixed potential and outputs a signal at a "Low" level in a case where the first voltage is equal to or higher than the fixed potential;
a third direct-current power supply that is connected to the first power receiving terminal at a negative electrode thereof and outputs a voltage having a magnitude greater than the magnitude of a voltage output by the first direct-current power supply; and
a third comparator that compares a third voltage at a positive electrode of the third direct-current power supply and the fixed potential and outputs a signal at a "High" level in a case where the third voltage is lower than the fixed potential and outputs a signal at a "Low" level in a case where the third voltage is equal to or higher than the fixed potential,
the second voltage detecting circuit has:
a second direct-current power supply that is connected to the second power receiving terminal at a negative electrode thereof and outputs a voltage having a same magnitude as a voltage output by the first direct-current power supply; and
a second comparator that compares a second voltage at a positive electrode of the second direct-current power supply and the fixed potential and outputs a signal at a "High" level in a case where the second voltage is lower than the fixed potential and outputs a signal at a "Low" level in a case where the second voltage is equal to or higher than the fixed potential;

a fourth direct-current power supply that is connected to the second power receiving terminal at a negative electrode thereof and outputs a voltage having a same magnitude as the voltage output by the third direct-current power supply; and a fourth comparator that compares a fourth voltage at a positive electrode of the fourth direct-current power supply and the fixed potential and outputs a signal at a "High" level in a case where the fourth voltage is lower than the fixed potential and outputs a signal at a "Low" level in a case where the fourth voltage is equal to or higher than the fixed potential, the first controlling circuit has:
a first inverter connected to an output of the fourth comparator at an input thereof and to a gate of the first pMOS transistor at an output thereof, the second controlling circuit has:
a second inverter connected to an output of the third comparator at an input thereof and to a gate of the second pMOS transistor at an output thereof, the third controlling circuit has:
a third inverter that receives the current detection signal;
a first AND circuit connected to the output of the first comparator and an output of the third inverter at inputs thereof; and
a first driver connected to an output of the first AND circuit at an input thereof and to the gate of the first nMOS transistor at an output thereof, and the fourth controlling circuit has:
a fourth inverter that receives the current detection signal;
a second AND circuit connected to the output of the second comparator and an output of the fourth inverter at inputs thereof; and
a second driver connected to an output of the second AND circuit at an input thereof and to the gate of the second nMOS transistor at an output thereof.

7. The rectifying apparatus according to claim 1, wherein the first voltage detecting circuit has:
a first direct-current power supply connected to the first power receiving terminal at a negative electrode thereof; and
a first comparator that compares a first voltage at a positive electrode of the first direct-current power supply and the fixed potential and outputs a signal at a "High" level in a case where the first voltage is lower than the fixed potential and outputs a signal at a "Low" level in a case where the first voltage is equal to or higher than the fixed potential, the second voltage detecting circuit has:
a second direct-current power supply that is connected to the second power receiving terminal at a negative electrode thereof and outputs a voltage having a same magnitude as a voltage output by the first direct-current power supply; and
a second comparator that compares a second voltage at a positive electrode of the second direct-current power supply and the fixed potential and outputs a signal at a "High" level in a case where the second voltage is lower than the fixed potential and outputs a signal at a "Low" level in a case where the second voltage is equal to or higher than the fixed potential, the first controlling circuit has:
a first inverter connected to an output of the second comparator at an input thereof and to a gate of the first pMOS transistor at an output thereof, the second controlling circuit has:
a second inverter connected to an output of the first comparator at an input thereof and to a gate of the second pMOS transistor at an output thereof, the third controlling circuit has:
a third inverter that receives the current detection signal;
a first AND circuit connected to the output of the first comparator and an output of the third inverter at inputs thereof; and
a first driver connected to an output of the first AND circuit at an input thereof and to the gate of the first nMOS transistor at an output thereof, and the fourth controlling circuit has:
a fourth inverter that receives the current detection signal;
a second AND circuit connected to the output of the second comparator and an output of the fourth inverter at inputs thereof; and
a second driver connected to an output of the second AND circuit at an input thereof and to the gate of the second nMOS transistor at an output thereof.

8. The rectifying apparatus according to claim 1, wherein the current detecting circuit has:
a converting circuit that outputs a converted voltage responsive to the load current; and
a current detecting comparator that compares the converted voltage and a preset reference voltage and outputs a signal responsive to a result of the comparison as the current detection signal.

9. The rectifying apparatus according to claim 1, wherein the fixed potential is a ground.

10. The rectifying apparatus according to claim 1, wherein the rectifying apparatus transmits a signal containing information based on the load current from the power receiving coil to a power transmitting coil in a power transmitting apparatus, and
the power transmitting apparatus obtains, by envelope detection, the information based on the load current from the signal received at the power transmitting coil.

11. A rectifying apparatus that rectifies a current between a first power receiving terminal and a second power receiving terminal and outputs the rectified current, comprising:
a first pMOS transistor connected to an output terminal at a source thereof and to the first power receiving terminal at a drain thereof;
a second pMOS transistor connected to the output terminal at a source and to the second power receiving terminal at a drain thereof;
a first nMOS transistor connected to the first power receiving terminal at a drain thereof and to a fixed potential at a source thereof;
a second nMOS transistor connected to the second power receiving terminal at a drain thereof and to the fixed potential at a source thereof;
a current detecting circuit that detects a load current flowing between a load terminal to which a load is connected and the output terminal and outputs a current detection signal responsive to a result of comparison between the load current and a preset threshold;
a first voltage detecting circuit that detects a voltage between the first power receiving terminal and the fixed potential or between the output terminal and the first power receiving terminal;
a second voltage detecting circuit that detects a voltage between the second power receiving terminal and the fixed potential in a case where the first voltage detecting circuit detects the voltage between the first power receiving terminal and the fixed potential, and detects a voltage between the output terminal and the second power receiving terminal in a case where the first voltage detecting circuit detects the voltage between the output terminal and the first power receiving terminal;
a first controlling circuit that controls the first pMOS transistor based on a result of detection by the second voltage detecting circuit;
a second controlling circuit that controls the second pMOS transistor based on a result of detection by the first voltage detecting circuit;
a third controlling circuit that controls the first nMOS transistor based on the current detection signal and the result of detection by the first voltage detecting circuit; and
a fourth controlling circuit that controls the second nMOS transistor based on the current detection signal and the result of detection by the second voltage detecting circuit.

12. The rectifying apparatus according to claim 11, wherein the second controlling circuit turns on the second pMOS transistor, and the third controlling circuit turns on the first nMOS transistor in a case where the first voltage detecting circuit detects that the voltage at the first power receiving terminal is lower than the fixed potential,
the second controlling circuit turns off the second pMOS transistor, and the third controlling circuit turns off the first nMOS transistor in a case where the first voltage detecting circuit detects that the voltage at the first power receiving terminal is equal to or higher than the fixed potential,
the first controlling circuit turns on the first pMOS transistor, and the fourth controlling circuit turns on the second nMOS transistor in a case where the second voltage detecting circuit detects that the voltage at the second power receiving terminal is lower than the fixed potential, and
the first controlling circuit turns off the first pMOS transistor, and the fourth controlling circuit turns off the second nMOS transistor in a case where the second voltage detecting circuit detects that the voltage at the second power receiving terminal is equal to or higher than the fixed potential.

13. The rectifying apparatus according to claim 11, wherein in a case where the current detection signal indicates that the load current is lower than the threshold,
the third controlling circuit forcedly turns off the first nMOS transistor, and the fourth controlling circuit forcedly turns off the second nMOS transistor.

14. The rectifying apparatus according to claim 11, wherein the second controlling circuit turns on the second pMOS transistor, and after that, the third controlling circuit turns on the first nMOS transistor in a case where the first voltage detecting circuit detects that the voltage at the first power receiving terminal is lower than a fixed potential,
the third controlling circuit turns off the first nMOS transistor, and after that, the second controlling circuit turns off the second pMOS transistor in a case where the first voltage detecting circuit detects that the voltage at the first power receiving terminal is equal to or higher than the fixed potential,
the first controlling circuit turns on the first pMOS transistor, and after that, the fourth controlling circuit turns on the second nMOS transistor in a case where the second voltage detecting circuit detects that the voltage at the second power receiving terminal is lower than the fixed potential, and
the fourth controlling circuit turns off the second nMOS transistor, and after that, the first controlling circuit turns off the first pMOS transistor in a case where the second voltage detecting circuit detects that the voltage at the second power receiving terminal is equal to or higher than the fixed potential.

15. The rectifying apparatus according to claim 14, further comprising:
a first switch element connected between a gate of the first nMOS transistor and the fixed potential;
a fifth controlling circuit that controls the first switch element based on the current detection signal and the result of detection by the first voltage detecting circuit;
a second switch element connected between a gate of the second nMOS transistor and the fixed potential; and
a sixth controlling circuit that controls the second switch element based on the current detection signal and the result of detection by the second voltage detecting circuit.

16. The rectifying apparatus according to claim 14, wherein the first voltage detecting circuit has:
a first direct-current power supply connected to the first power receiving terminal at a negative electrode thereof;
a first comparator that compares a first voltage at a positive electrode of the first direct-current power supply and the fixed potential and outputs a signal at a "High" level in a case where the first voltage is lower than the fixed potential and outputs a signal at a "Low" level in a case where the first voltage is equal to or higher than the fixed potential;
a third direct-current power supply that is connected to the first power receiving terminal at a negative electrode thereof and outputs a voltage having a magnitude greater than the magnitude of a voltage output by the first direct-current power supply; and
a third comparator that compares a third voltage at a positive electrode of the third direct-current power supply and the fixed potential and outputs a signal at a "High" level in a case where the third voltage is lower than the fixed potential and outputs a signal at a "Low" level in a case where the third voltage is equal to or higher than the fixed potential,
the second voltage detecting circuit has:
a second direct-current power supply that is connected to the second power receiving terminal at a negative electrode thereof and outputs a voltage having a same magnitude as a voltage output by the first direct-current power supply; and
a second comparator that compares a second voltage at a positive electrode of the second direct-current power supply and the fixed potential and outputs a signal at a "High" level in a case where the second voltage is lower than the fixed potential and outputs a signal at a "Low" level in a case where the second voltage is equal to or higher than the fixed potential;
a fourth direct-current power supply that is connected to the second power receiving terminal at a negative electrode thereof and outputs a voltage having a same magnitude as the voltage output by the third direct-current power supply; and
a fourth comparator that compares a fourth voltage at a positive electrode of the fourth direct-current power supply and the fixed potential and outputs a signal at a "High" level in a case where the fourth voltage is lower than the fixed potential and outputs a signal at a "Low" level in a case where the fourth voltage is equal to or higher than the fixed potential, the first controlling circuit has:
a first inverter connected to an output of the fourth comparator at an input thereof and to a gate of the first pMOS transistor at an output thereof, the second controlling circuit has:
a second inverter connected to an output of the third comparator at an input thereof and to a gate of the second pMOS transistor at an output thereof, the third controlling circuit has:
a third inverter that receives the current detection signal;
a first AND circuit connected to the output of the first comparator and an output of the third inverter at inputs thereof; and
a first driver connected to an output of the first AND circuit at an input thereof and to the gate of the first nMOS transistor at an output thereof, and the fourth controlling circuit has:
a fourth inverter that receives the current detection signal;
a second AND circuit connected to the output of the second comparator and an output of the fourth inverter at inputs thereof; and
a second driver connected to an output of the second AND circuit at an input thereof and to the gate of the second nMOS transistor at an output thereof.

17. The rectifying apparatus according to claim 11, wherein the first voltage detecting circuit has:
a first direct-current power supply connected to the first power receiving terminal at a negative electrode thereof; and
a first comparator that compares a first voltage at a positive electrode of the first direct-current power supply and the fixed potential and outputs a signal at a "High" level in a case where the first voltage is lower than the fixed potential and outputs a signal at a "Low" level in a case where the first voltage is equal to or higher than the fixed potential, the second voltage detecting circuit has:
a second direct-current power supply that is connected to the second power receiving terminal at a negative electrode thereof and outputs a voltage having a same magnitude as a voltage output by the first direct-current power supply; and
a second comparator that compares a second voltage at a positive electrode of the second direct-current power supply and the fixed potential and outputs a signal at a "High" level in a case where the second voltage is lower than the fixed potential and outputs a signal at a "Low" level in a case where the second voltage is equal to or higher than the fixed potential, the first controlling circuit has:
a first inverter connected to an output of the second comparator at an input thereof and to a gate of the first pMOS transistor at an output thereof, the second controlling circuit has:
a second inverter connected to an output of the first comparator at an input thereof and to a gate of the second pMOS transistor at an output thereof, the third controlling circuit has:
a third inverter that receives the current detection signal;
a first AND circuit connected to the output of the first comparator and an output of the third inverter at inputs thereof; and
a first driver connected to an output of the first AND circuit at an input thereof and to the gate of the first nMOS transistor at an output thereof, and the fourth controlling circuit has:
a fourth inverter that receives the current detection signal;
a second AND circuit connected to the output of the second comparator and an output of the fourth inverter at inputs thereof; and
a second driver connected to an output of the second AND circuit at an input thereof and to the gate of the second nMOS transistor at an output thereof.

18. The rectifying apparatus according to claim 11, wherein the current detecting circuit has:
a converting circuit that outputs a converted voltage responsive to the load current; and
a current detecting comparator that compares the converted voltage and a preset reference voltage and outputs a signal responsive to a result of the comparison as the current detection signal.

19. The rectifying apparatus according to claim 11, wherein the fixed potential is a ground.

20. The rectifying apparatus according to claim 11, wherein the rectifying apparatus transmits a signal containing information based on the load current from the power receiving coil to a power transmitting coil in a power transmitting apparatus, and
the power transmitting apparatus obtains, by envelope detection, the information based on the load current from the signal received at the power transmitting coil.

* * * * *